United States Patent
DiFatta et al.

(10) Patent No.: US 9,840,407 B2
(45) Date of Patent: Dec. 12, 2017

(54) GESTURE INTERFACE FOR BEVERAGE DISPENSER

(71) Applicant: Cornelius, Inc., St. Paul, MN (US)

(72) Inventors: Vincenzo DiFatta, Wood Dale, IL (US); Jeffrey Joray, Lake Villa, IL (US); Christopher Knight, Lisle, IL (US)

(73) Assignee: Cornelius, Inc., St. Paul, MN (US)

( * ) Notice: Subject to any disclaimer, the term of this patent is extended or adjusted under 35 U.S.C. 154(b) by 0 days.

(21) Appl. No.: 14/993,388

(22) Filed: Jan. 12, 2016

(65) Prior Publication Data

US 2016/0229678 A1    Aug. 11, 2016

Related U.S. Application Data

(60) Provisional application No. 62/114,317, filed on Feb. 10, 2015.

(51) Int. Cl.
| | |
|---|---|
| *B67D 1/08* | (2006.01) |
| *G06F 3/01* | (2006.01) |
| *G07F 13/00* | (2006.01) |

(52) U.S. Cl.
CPC ............ *B67D 1/0888* (2013.01); *G06F 3/011* (2013.01); *G06F 3/017* (2013.01); *G07F 13/00* (2013.01)

(58) Field of Classification Search
None
See application file for complete search history.

(56) References Cited

U.S. PATENT DOCUMENTS

| | | | |
|---|---|---|---|
| 4,509,690 | A | 4/1985 | Austin et al. |
| 4,658,988 | A | 4/1987 | Hassell |
| 5,360,140 | A | 11/1994 | Senghaas |
| 6,474,504 | B1 | 11/2002 | Simmons et al. |
| 6,478,192 | B2 | 11/2002 | Heyes |
| 6,564,971 | B2 | 5/2003 | Heyes |
| 6,681,031 | B2 | 1/2004 | Cohen et al. |
| 6,751,525 | B1 | 6/2004 | Crisp, III |
| 6,799,085 | B1 | 9/2004 | Crisp, III |
| 6,857,541 | B1 | 2/2005 | Crisp, III |
| 6,986,263 | B2 | 1/2006 | Crisp, III |
| 6,994,231 | B2 | 2/2006 | Jones |
| 7,083,071 | B1 | 8/2006 | Crisp, III et al. |
| 7,159,743 | B2 | 1/2007 | Brandt et al. |
| 7,204,259 | B2 | 4/2007 | Crisp, III |

(Continued)

OTHER PUBLICATIONS

International Search Report dated May 6, 2016.

*Primary Examiner* — Gene O Crawford
*Assistant Examiner* — Stephen L Akridge
(74) *Attorney, Agent, or Firm* — Andrus Intellectual Property Law, LLP

(57) ABSTRACT

A beverage dispensing system includes a plurality of beverage sources each containing a beverage component, and at least one flow valve connected to one or more of the beverage sources and operable to control a flow of the beverage component therefrom. The system further includes a graphical display that presents a plurality of available beverages and a gesture capture device that receives a selection gesture input to select a beverage from the plurality of available beverages. A controller is also included that adjusts the at least one flow valve based on the selection gesture input to dispense the selected beverage.

17 Claims, 11 Drawing Sheets

(56) References Cited

U.S. PATENT DOCUMENTS

| | | |
|---|---|---|
| 7,356,381 B2 | 4/2008 | Crisp, III |
| 7,708,172 B2 | 5/2010 | Crisp, III et al. |
| 7,754,025 B1 | 7/2010 | Crisp, III |
| 7,757,896 B2 | 7/2010 | Carpenter et al. |
| 7,978,184 B2* | 7/2011 | Morrison ............... G06F 3/043 173/177 |
| 8,103,378 B2 | 1/2012 | Crisp, III |
| 8,181,824 B2 | 5/2012 | Ziesel et al. |
| 8,190,290 B2 | 5/2012 | Crisp, III |
| 8,290,615 B2 | 10/2012 | Crisp, III et al. |
| 8,290,616 B2 | 10/2012 | Crisp, III |
| 8,417,376 B1* | 4/2013 | Smolen ................. G07F 9/023 221/155 |
| 8,548,624 B2 | 10/2013 | Crisp, III |
| 8,565,917 B2 | 10/2013 | Crisp |
| 8,567,642 B2 | 10/2013 | Hoover |
| 8,606,395 B2 | 12/2013 | Crisp, III |
| 8,676,376 B2 | 3/2014 | Quartarone et al. |
| 8,746,506 B2 | 6/2014 | Jersey et al. |
| 9,090,446 B2 | 7/2015 | Crisp, III |
| 9,090,447 B2 | 7/2015 | Crisp, III |
| 9,090,448 B2 | 7/2015 | Crisp, III |
| 9,090,449 B2 | 7/2015 | Crisp, III |
| 9,142,078 B2* | 9/2015 | Lin ....................... G07F 9/023 |
| 2002/0020711 A1* | 2/2002 | Glass ..................... F25C 5/007 222/1 |
| 2005/0251287 A1 | 11/2005 | Thornton et al. |
| 2008/0051933 A1 | 2/2008 | Vrachan et al. |
| 2009/0103780 A1* | 4/2009 | Nishihara ............... G06F 3/017 382/103 |
| 2009/0177318 A1 | 7/2009 | Sizemore |
| 2011/0032185 A1* | 2/2011 | Yamamoto ............. G06F 3/038 345/157 |
| 2011/0080490 A1* | 4/2011 | Clarkson ................ G06F 3/017 348/222.1 |
| 2011/0264284 A1 | 10/2011 | Rudick et al. |
| 2011/0315711 A1* | 12/2011 | Hecht .................... A47J 31/52 222/129.1 |
| 2012/0298692 A1 | 11/2012 | Jersey et al. |
| 2012/0325845 A1* | 12/2012 | Newman .............. B67D 1/0022 222/1 |
| 2013/0082978 A1* | 4/2013 | Horvitz .................. G06F 3/017 345/175 |
| 2013/0096715 A1 | 4/2013 | Chung et al. |
| 2014/0142748 A1* | 5/2014 | Geigel ................... G07F 9/026 700/237 |
| 2014/0365001 A1 | 12/2014 | Tomkins et al. |
| 2015/0355810 A1* | 12/2015 | Abrach ................ G06F 3/0488 222/1 |

* cited by examiner

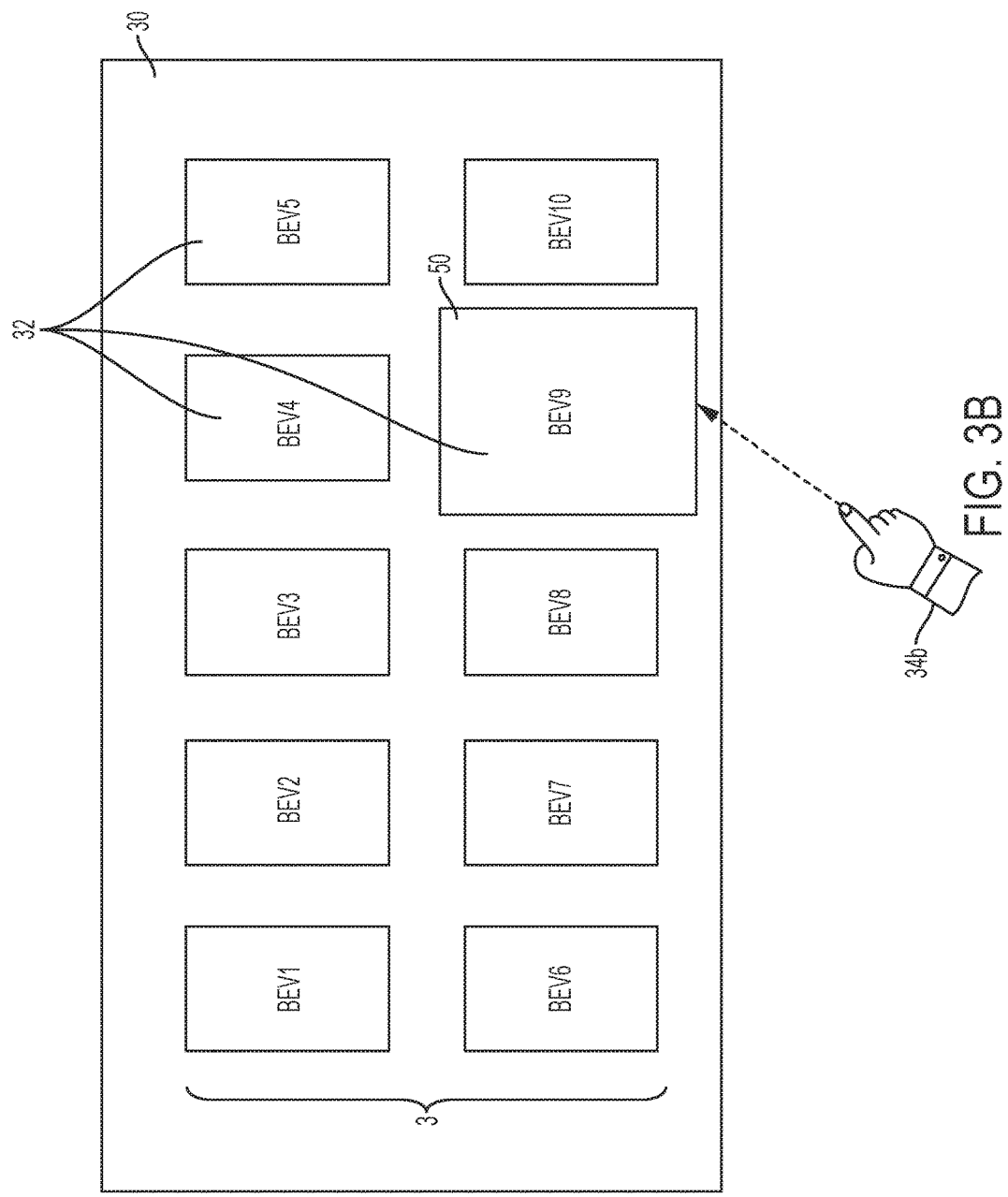

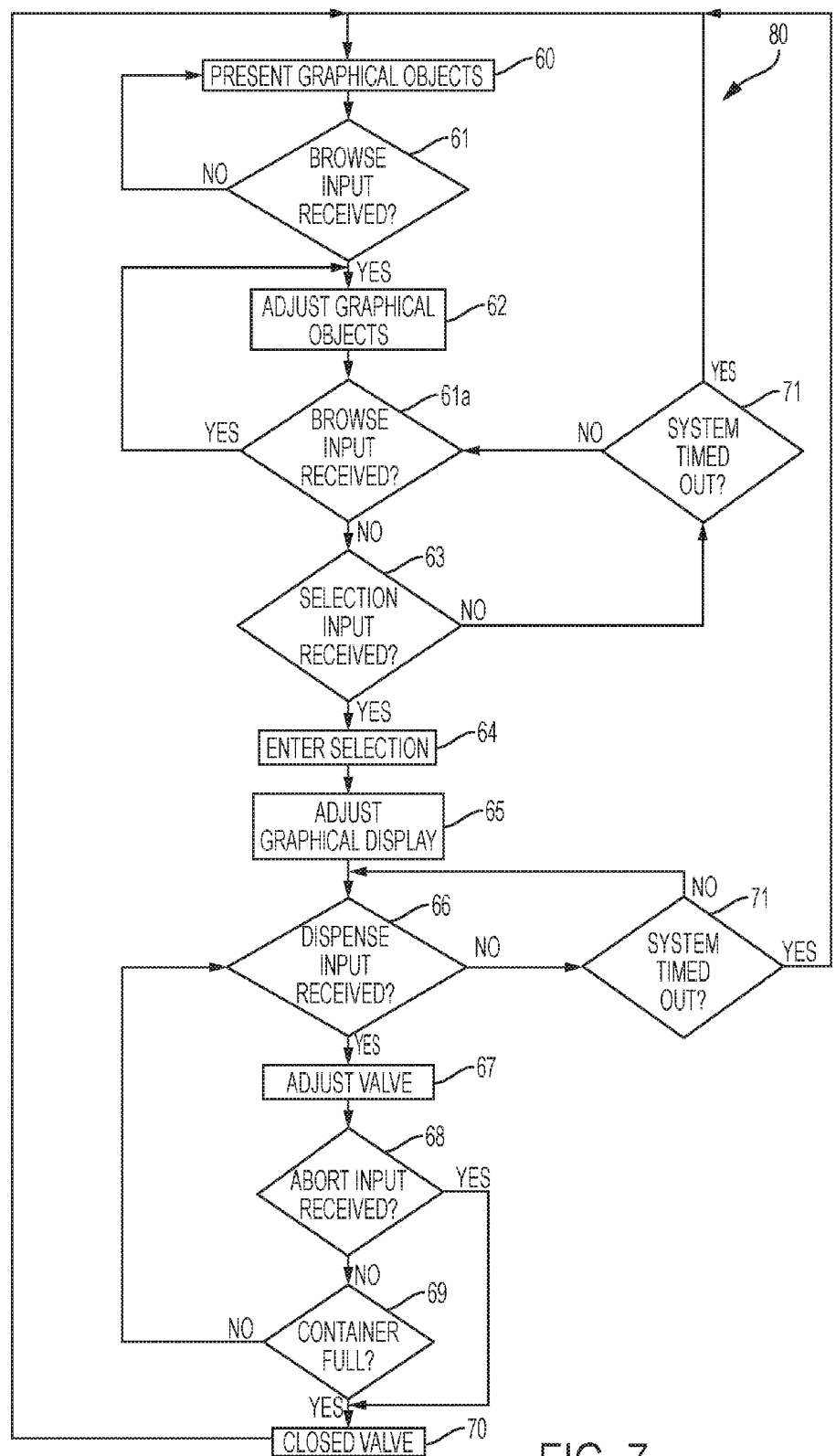

GESTURE INTERFACE FOR BEVERAGE DISPENSER

CROSS-REFERENCE TO RELATED APPLICATION

The present application is based on and claims priority to U.S. Provisional Patent Application Ser. No. 62/114,317 filed Feb. 10, 2015, the disclosure of which is incorporated herein by reference.

FIELD

The present disclosure relates to beverage dispensing. More specifically, the present disclosure relates to user interface systems and methods for controlling a beverage dispensing system.

BACKGROUND

Beverage dispensers may offer a user a variety of available beverage products or selections for dispense. Beverage dispensers may dispense a beverage selected by the user from one or more nozzles, from which a plurality of the available beverage products may be dispensed. Currently available user interfaces may use buttons and/or a touch-sensitive user interface to receive user inputs and selections of the beverage for dispense.

The following U.S. Patents are hereby incorporated herein by reference in entirety.

U.S. Pat. No. 5,360,140 discloses a double sided primed circuit board is shown wherein one side is etched for receiving a plurality of surface mounted components constituting a control circuit. In one embodiment the control circuit provides for regulating the operation of a plurality to the beverage dispensing valves. An op-amp monitors the conductor for sensing the operation of the beverage dispensing valves as a function of a voltage drop there across. The conductor operates as a resistor, and any heating thereof that occurs as a result of the operation of the beverage dispensing valves is dissipated over the entire surface area of the circuit board. The control circuit also operates a dump valve for periodically dumping beverage if any of the valves have not been operated for a set period of time. The control circuit deactivates the operation of the dump valve during any sensed operation of one of the beverage dispense valves.

U.S. Pat. No. 6,474,504 discloses a flow rate control valve through which a liquid flows and from which the liquid is dispensed. The flow rate of the liquid is sensed and that information is sent to a microprocessor based control. The control operates a drive of the control valve so as to vary the resultant rate at which the liquid is dispensed therefrom. The drive operates a piston closure member that extends closely within a cylindrical passageway. The passageway has an inlet end and an outlet end and the drive operates the closure member in the passageway to a plurality of positions from a first position at the inlet end and a second position at the outlet end. The wall of the passageway defines at least one groove having a transverse cross-section that increases in area in a downstream direction from the passageway inlet to the passageway outlet or in an upstream direction from the passageway outlet to the passageway inlet, whereby movement of the closure between the first position and the second position varies the flow rate of the liquid through the control valve as a function of the cross-sectional area of the groove.

U.S. Pat. No. 6,478,192 discloses a post mix beverage dispense apparatus has a mixing head 10 arranged to receive different combinations of a concentrate and a diluent for dispensing any selected one of a range of beverages. The concentrates are delivered to the head 10 in dedicated flow lines 14, 16, 18, 20 under the control of respective valves 22, 24, 26, 28 actuated via a control board 52 in response to user selection of a desired beverage at a control panel 50. The diluent is delivered to the head 10 in a flow line 30 under the control of a changeover valve 32 for selectively correcting sources of different diluents to the flow line 30 via the control board 52 in response to user selection of the desired beverage at the control panel 50. The changeover valve 32 is positioned close to the mixing head 10 to minimize the volume of diluent remaining between the valve 32 and the head 10 after dispense. In a preferred arrangement, a control valve 38 is provided between the changeover valve 32 and the head 10 for providing a metered flow of diluent.

U.S. Pat. No. 6,564,971 discloses a mixing valve is shown for mixing a concentrate fluid with a diluent fluid in a desired ratio. A single actuator is used to open and close both the diluent and concentrate flows by operation of a shaft. A diaphragm extends around the shaft and defines fluidly separate upper and lower chambers within a valve body. Inlets to the upper and lower chambers are connected to sources of the concentrate and diluent, respectively. The upper and lower chambers each have outlets fluidly connected to a mixing and dispensing nozzle. The actuator moves the shaft from a fully extended closed position to an intermediate t retracted open position to open the lower chamber outlet to the mixing nozzle to initiate diluent flow. The actuator is then moved to a fully retracted position and then reciprocated between the fully retracted and intermediate retracted position whereby the diaphragm serves to pump the concentrate from the upper chamber to the mixing nozzle. Non-return valves are placed in the inlet and outlet of the upper chamber. The non-return valves allow the concentrate to flow only from the source thereof to the mixing nozzle during the pumping thereof. Flow sensors are placed in each of the concentrate and diluent flows and are connected to an electronic control. The control provides for determining total combined dispensed volume of the diluent and concentrate and stopping dispensing at desired predetermined total volumes.

U.S. Pat. No. 7,159,743 discloses a device for injecting additive fluids into a stream of a primary fluid as it passes through a common central bore is characterized by a series of specially formed layers each having a particular fluid flow pattern formed therein. The layers are registered one above the other and sandwiched together to form an integral unit in which there are separate fluid flow channels for each of a desired number of additive fluids. Each channel has an inlet for receiving fluid from an associated pressurized source and a plurality of outlets terminating in angularly spaced relationship around an interior perimeter surface of the common bore. A selection mechanism provides for choosing a desired additive fluid for injection into the primary fluid in a manner coordinated with the flow of the primary fluid through the common bore.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

A beverage dispensing system includes a plurality of beverage sources each containing a beverage component, and at least one flow valve connected to one or more of the beverage sources and operable to control a flow of the beverage component therefrom. The system further includes a graphical display that presents a plurality of available beverages and a gesture capture device that receives a selection gesture input to select a beverage from the plurality of available beverages. A controller is also included that adjusts the at least one flow valve based on the selection gesture input to dispense the selected beverage.

One embodiment of a method of dispensing a beverage from a beverage dispensing system includes presenting at least one graphical object on a graphical display, each graphical object representing an available beverage. A browse gesture input is received at a gesture input device, and then the graphical object on the graphical display is adjusted based on the browse gesture input. A selection gesture input is received selecting a graphical object on the display, and then the beverage dispensing system is controlled by a controller to dispense a beverage based on the selection gesture input.

In further exemplary embodiments, in addition to navigation and option selection through input commands, interactive gestures provide the user with a unique interactive experience when operating a beverage dispenser to dispense a beverage.

BRIEF DESCRIPTION OF THE DRAWINGS

Examples are described with reference to the following drawing figures. The same numbers are used throughout the figures to reference like features and components.

FIGS. 3A and 3B depict exemplary embodiments of presentations on a graphical display in conjunction with gesture inputs.

FIG. 7 is a flow chart depicting one embodiment of a method of dispensing a beverage from a beverage dispensing system.

DETAILED DESCRIPTION OF THE DRAWINGS

Figure 1:
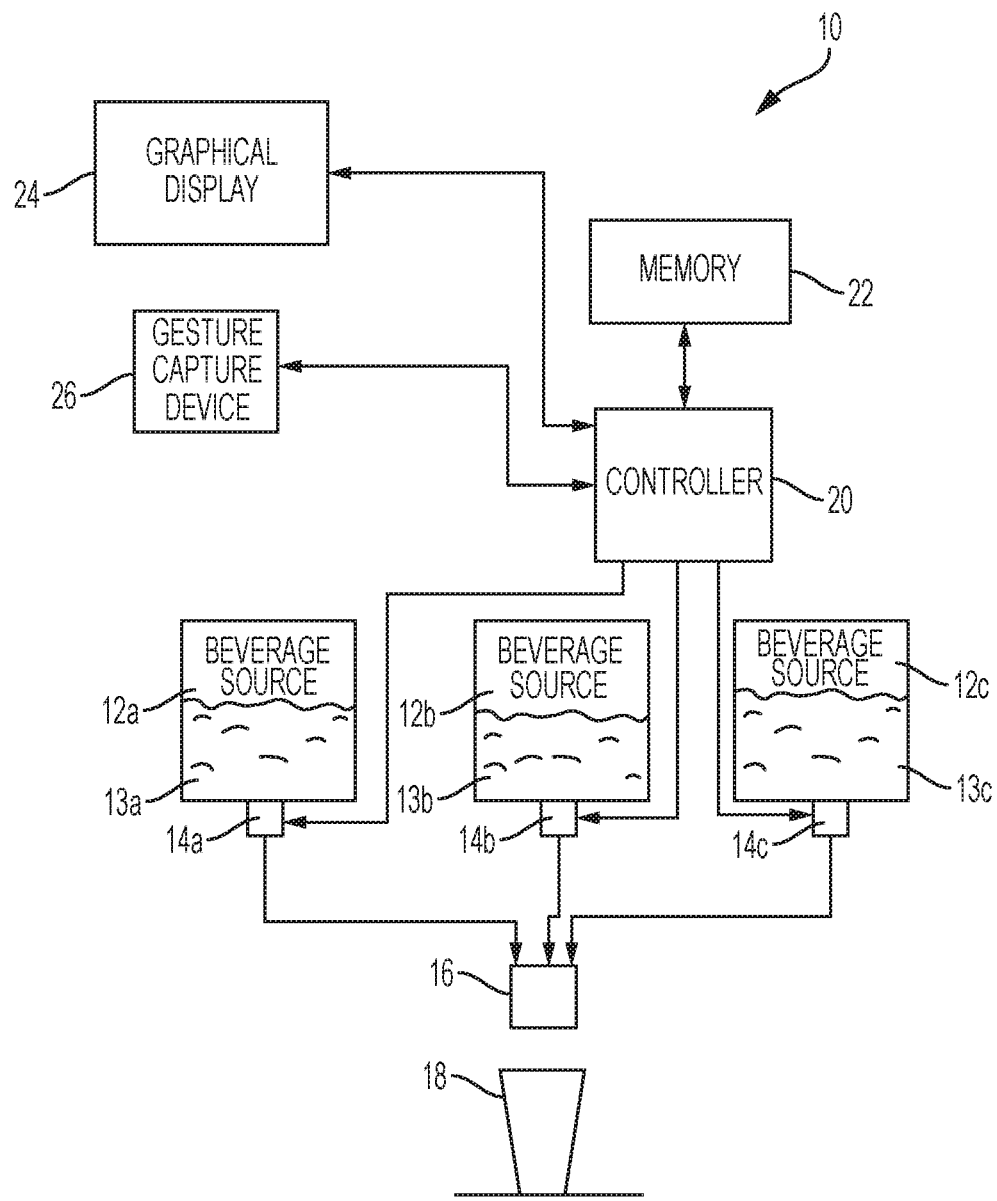
FIG. 1 is a schematic depiction of an exemplary embodiment of a beverage dispensing system.

The present inventors have endeavored to provide an improved user input platform and experience for the selection and dispense of beverages from a beverage dispensing unit. Through their experimentation and research in the field of beverage dispensing systems, the inventors have recognized that touch user interfaces for beverage dispensers present challenges. For example, touch interfaces, such as touch screens or push buttons, are susceptible to physical damage (e.g. from scratches or cracks to the interface). Furthermore, touch screens may be susceptible to electromagnetic interference (EMI). Additionally, touch-sensitive interfaces create a source of cross-contamination and/or pathogen communication, as they require a common surface touched by multiple different users, which is especially undesirable in environments where food and beverage are provided and/or consumed. Finally, users with prosthesis may find operation of touch-operated devices to be challenging, if usable at all. Moreover, the inventors recognized that certain desirable touch interfaces, such as touch screens, are expensive to purchase and maintain, and are prone to failure in high-demand settings.

Accordingly, upon recognition of these problems, the inventors developed the presently disclosed beverage dispensing systems 10 and methods 80 in order to overcome and/or avoid those problems. In some exemplary embodiments, a gesture capture device 26 is incorporated into a beverage dispensing system 10 where the gesture capture device 26 is communicatively connected to a controller 20 of the beverage dispensing system, or beverage dispenser, 10. In exemplary embodiments, users are able to intuitively navigate menus of beverage selections and options with gesture controls exemplarily formed by a hand and/or arm of the user.

FIG. 1 depicts an exemplary embodiment of a beverage dispensing system 10 capable of dispensing any number of available beverages 3. The beverage dispensing system 10 includes a plurality of beverage sources 12a-12c. Each beverage source contains a beverage component 13a-13c. In exemplary embodiments, the plurality of beverage components 13a-13c may exemplarily be premixed beverage products, such as soda or juice products, or alternatively may be elements to be combined to create the dispensed beverage products. For example, one of the beverage sources 12a-12c may contain carbonated water, or soda, and the remaining sources may contain syrups or concentrates, which may be combined with the carbonated water to dispense known soda beverage products. Likewise, one of the beverage sources 12a-12c may contain water and may be mixed with syrups or concentrates in the other sources to dispense juices or other non-carbonated beverages. In an alternative embodiment where the beverage dispenser 13 may be comprised of beverage sources having premixed beverage products therein, dispensing a beverage may only require dispensing one beverage component 13a-13c from one beverage source 12a-12c. The flow of beverage from each beverage source 12a-12c is controlled by at least one flow valve 14a-14c operatively connected to that beverage source 12a-12c. The output of each flow valve 14a-14c goes to nozzle 16, which in some embodiments may provide mixing of beverage components 13a-13c from different beverage sources 12a-12c. The beverage may be dispensed from the nozzle 16 into container 18, which may exemplarily be a cup.

The beverage dispenser 10 further includes a controller 20 which is exemplarily a processor or a computer that is communicatively connected to a non-transient computer readable medium embodying computer memory 22, upon which one or more software program is stored. The software programs, upon execution by the controller 20, facilitates operation of the beverage dispenser 10 to carry out one or more of the functions as disclosed herein. The controller 20 is communicatively connected to a graphical display 24. The graphical display may exemplarily be a liquid crystal display (LCD) or other known type of graphical display. The controller 20 operates the graphical display 24 to present information regarding the available beverage products 3 and/or other selections available to the user when operating the beverage dispenser 10. These may be presented in a graphical user interface (GUI) 30 presented on the graphical display 24, examples of which will be provided in further detail herein.

The beverage dispenser 10 includes a gesture capture device 26, which is also communicatively connected to the controller 20. The gesture capture device 26 may receive gesture inputs as inputs to the beverage dispenser to facilitate the user's interaction with the information provided in the GUI 30 presented on the graphical display 24. The gesture capture device 26 may include modules, such as software modules, for identification of predefined features of predefined gestures, and subsequent generation of a corresponding command or communication. The gesture capture device 26 may be configured to communicate with the controller 20 regarding the detection of gestures, static gestures or symbols or dynamic motions. The gesture capture device 26 may be configured to detect specific gesture inputs, such as based on a mode of the system 10, and to communicate the detected gesture input to the controller 20, which will control various aspects of the system 10 accordingly. In exemplary embodiments, the gesture capture device 26 may include one or more cameras and/or motion sensor or detection devices configured to recognize and identify certain movement patterns or gesture configurations. By way of example, the gesture capture device 26 may be an Allegro APDS-9960, a Silicon Labs Si114x, or other motion sensor as may be recognized by a person of ordinary skill in the art in view of the present disclosure. To provide further exemplification, the gesture capture device 26 may further include a feature tracking algorithm that processes the sensor data or image data to output position and time information, which may then be processed by a gesture recognition algorithm. When a gesture is recognized, a command message corresponding to that gesture type may be sent to the controller 20.

The gesture inputs 34, 36, 38, 40 may be motion gestures or stationary gestures. To provide some examples, the gesture capture device 26 may be configured to detect, in conjunction with the controller, left and right swipe gestures, gestures toward and away from the gesture capture device 26, such as push and pull gestures, rotation or circular gestures, pinch gestures, grasp gestures, reach gestures, pour gestures, and drop gestures. Alternatively or additionally, the gesture capture device 26 may be configured to detect stationary gestures, such as a point gesture, a thumb-up or thumb-down gesture, an okay gesture, a gesture indicating a number (e.g., by extending that number of fingers), etc. Exemplary embodiments of gesture inputs 34, 36, 38, 40 and corresponding control of the beverage dispensing system are provided in further detail herein with respect to the exemplary embodiments presented in FIGS. 3A-B, 4A-B, 5A-B, and 6A-B, which are discussed herein.

Figure 2:
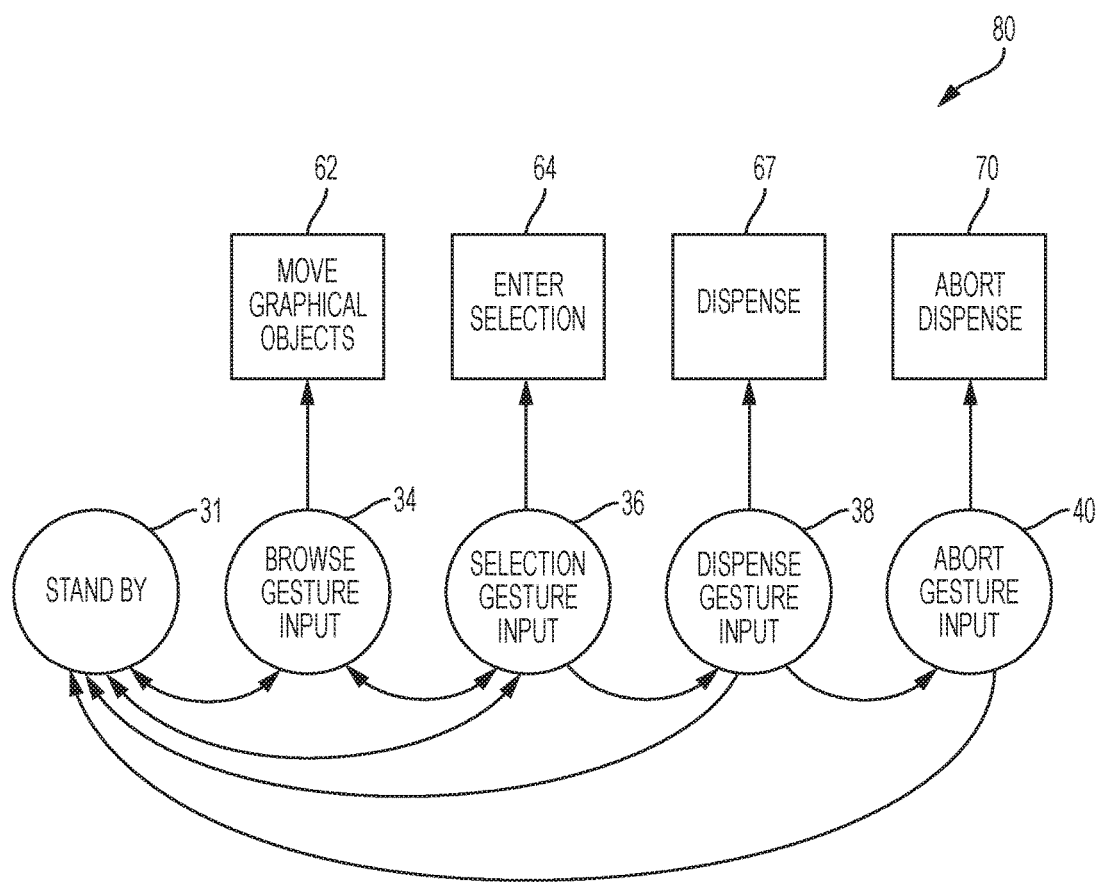
FIG. 2 is a state diagram depicting an exemplary embodiment of functional states of the beverage dispensing system of the present disclosure and associated gesture inputs.

FIG. 2 depicts an exemplary embodiment of a state diagram depicting an exemplary method 60 of dispensing a beverage and controlling a beverage dispensing system 10, and demonstrating relation of exemplary detected gesture inputs 34, 36, 38, 40 and resulting actions or functional states carried out by the controller 20, graphical display 24, and/or other aspects of the beverage dispensing system 10. The controller 20 may operate the beverage dispenser in a standby mode 31 in the absence of any detected gesture inputs. For example, in standby mode 31 the graphical user interface (GUI) 30 presented on the graphical display 24 may present the plurality of graphical objects 32 representative of each of a plurality of available beverages 3. In an exemplary embodiment, each of the graphical objects 32 graphically depict a bottle, can, or other container representing the respective available beverage 3, such as depicting the brand, logo, etc. of the available beverage 3. Alternatively or additionally, the standby mode 31 may play an advertisement or present instructions for use of the gesture interface for the beverage dispensing system 10.

Upon receiving a gesture input recognized by the gesture capture device 26, the controller operates the system as described herein. In the embodiment of FIG. 2, when the system 10 is in standby mode 31, the gesture capture device 26 is prepared to detect and receive a browse gesture input 34, which is a user providing input to cause the controller 20 to execute an action 62 to move the graphical objects 32 on the graphical display 24. For example, the GUI 30 may scroll, move through, highlight, etc. the graphical objects 32 presented on the graphical display 26. The graphical objects 32 may be alternately put into a selection position 50, which may be a precursor to the selection of that graphical object. In an exemplary embodiment, the selection position 50 may be a position on the GUI 30 and/or the graphical display 24 that the graphical object 32 may occupy, or it may be enlargement, highlighting, or otherwise identifying or selecting the graphical object 32. For example, a graphical object 32 may be placed in a selection position 50 by bringing it into focus or presenting it at a higher resolution. This indicates that graphical object 32 is available for selection. The gesture capture device 26 may be configured to receive any gesture as the browse gesture input 34. In exemplary embodiments, the gesture capture device 26 may be configured to receive a swipe gesture, point gesture, up or down gesture, etc. as a browse gesture input 34. Exemplary embodiments of browse gesture inputs 34 and exemplary associated GUIs 30 are presented in FIGS. 3A and 3B.

Figure 4A:
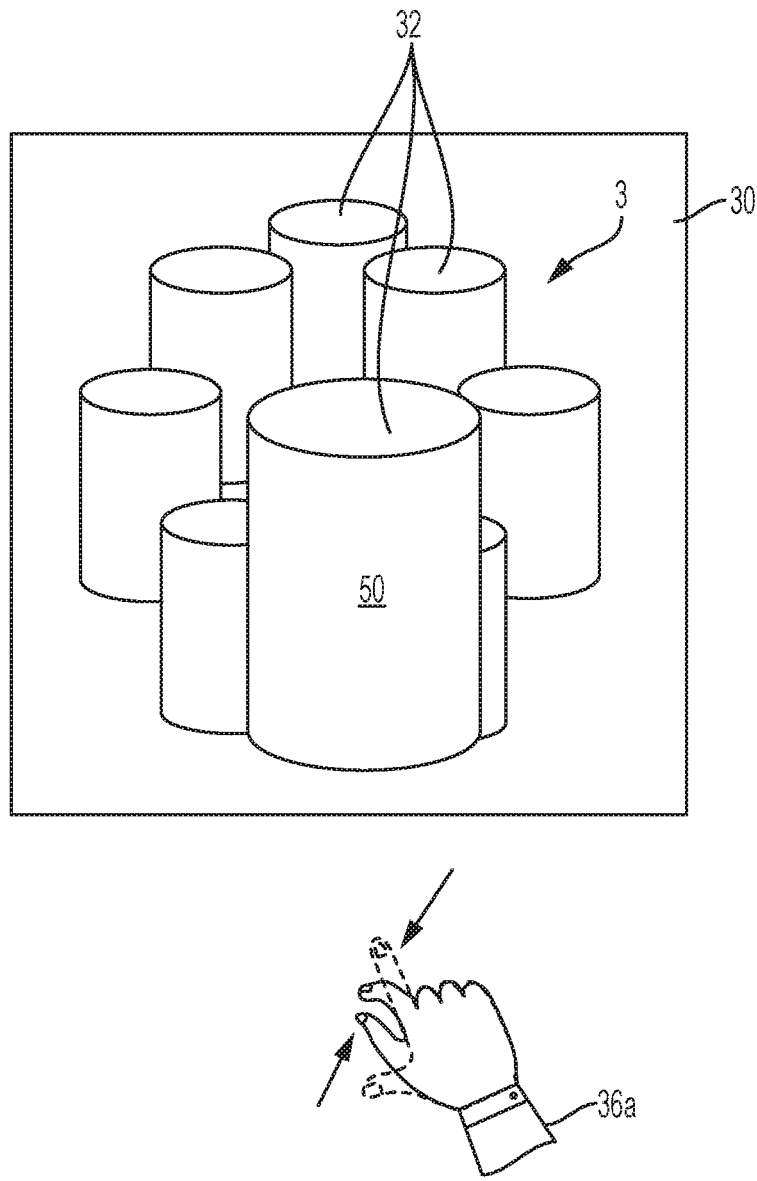
FIGS. 4A and 4B depict exemplary embodiments of presentations on a graphical display in conjunction with gesture inputs.
Figure 4B:
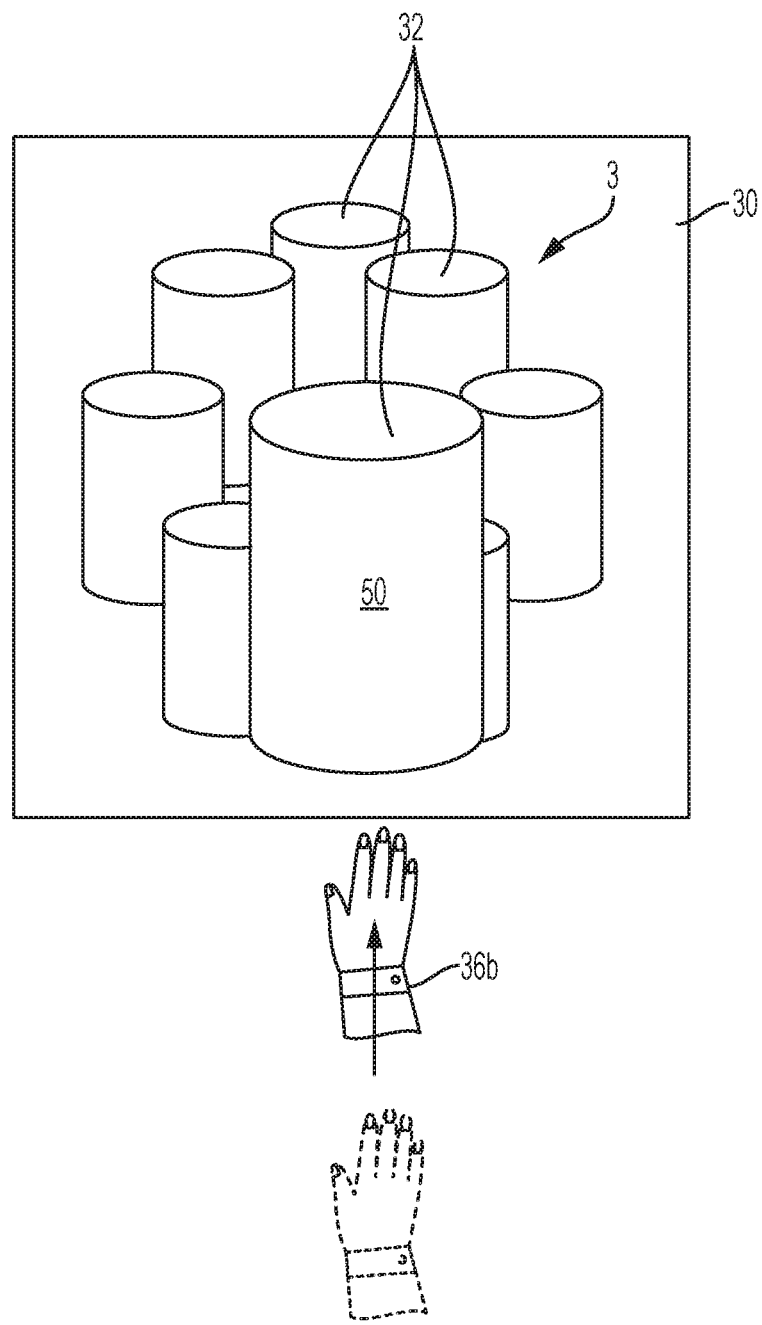

Once a browse gesture has been received, the controller 20 and gesture capture device 26 may then be in a mode prepared to detect and receive a selection gesture input 36 to select a beverage from the plurality of available beverages 3. For example, a graphical object 32 representative of the desired beverage may be selectable via a selection gesture input 36 when the user has put that graphical object 32 in selection position 50. The gesture capture device 26 may be configured to receive any gesture as the selection gesture input 36. In exemplary embodiments, the gesture capture device 26 may be configured to receive a pinch gesture, push gesture, reach gesture, or grasp gesture as a selection gesture input 36. Identification of this gesture may cause the controller 20 to enter the selection, action 64, and prepare the beverage dispensing system 10 to dispense the beverage associated with the graphical object 32 in the selection position 50. Further selections may be made in addition to beverage brand and/or type, including beverage size and/or the selection of additives, such as ice or flavorings (e.g., cherry, vanilla, lemon, etc.). FIGS. 4A and 4B present exemplary embodiments of selection gesture inputs 36 and associated GUIs 30.

Figure 5A:
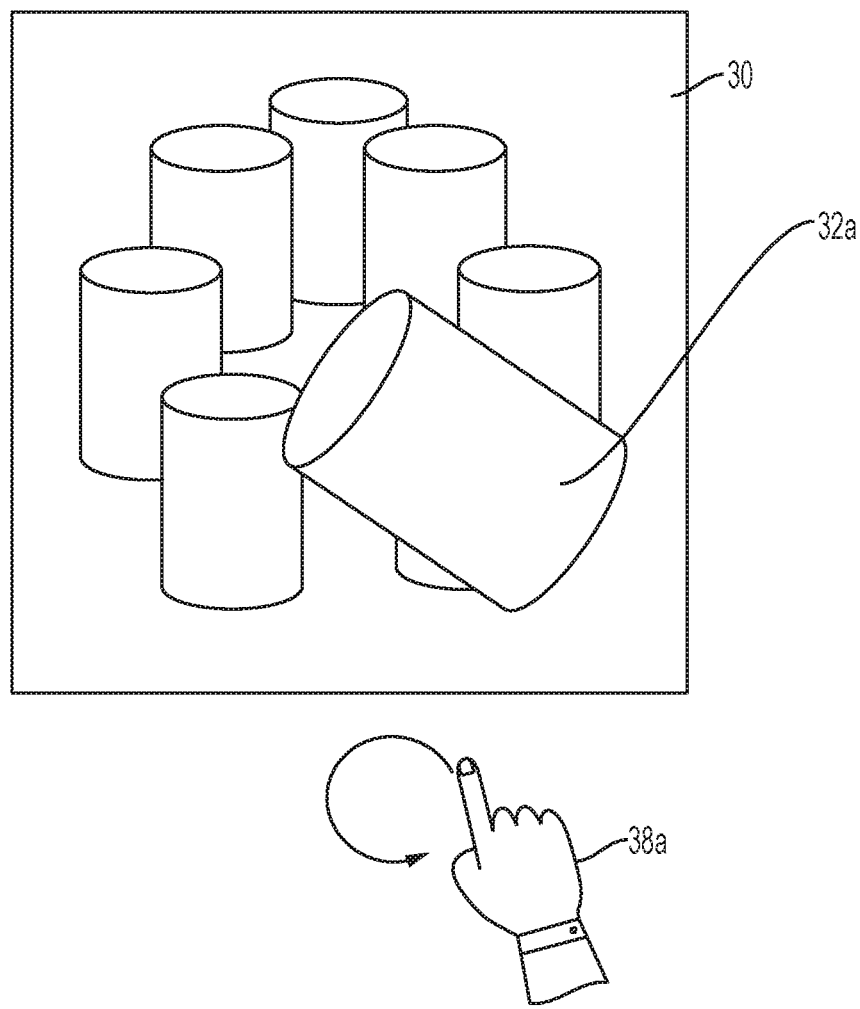
FIGS. 5A and 5B depict exemplary embodiments of presentations on a graphical display in conjunction with gesture inputs.
Figure 5B:
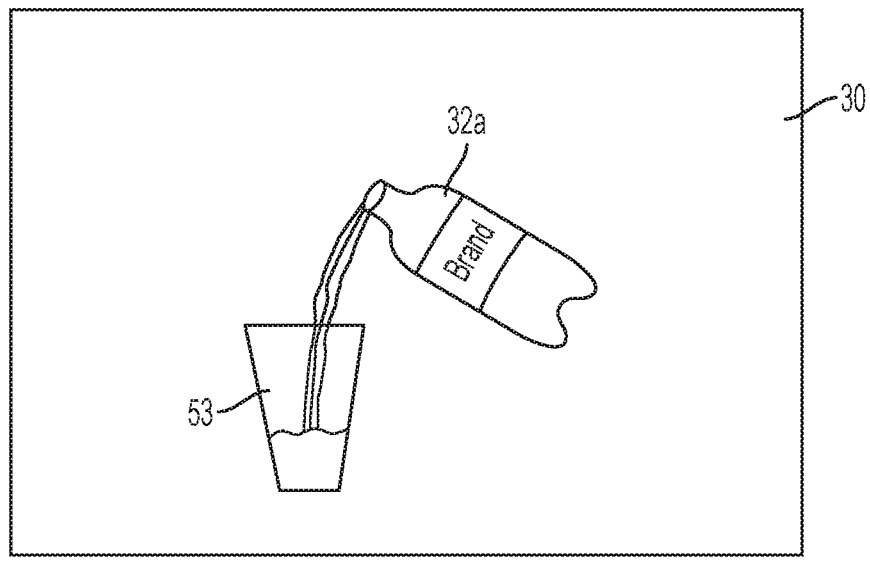
Figure 5B:
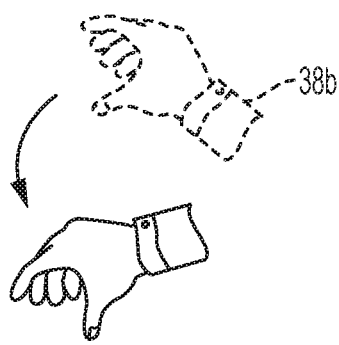

Next, after the beverage has been selected, the controller 20 may dispense the selected beverage, which may then be made available to the user. In another embodiment, the user may be able to use gesture inputs to control the dispensing process. In the embodiments depicted in FIGS. 2, 5A, and 5B, after the beverage has been selected the controller 20 and gesture capture device 26 may then be in a mode prepared to detect and receive a dispense gesture input 38 to control and/or initiate a dispense action 67. This may be an indication to the system 10 of when to dispense the beverage, such as an indication of when the selection process is complete and the beverage should be dispensed out of nozzle 16. For example, upon receipt of the dispense gesture input 38 the controller 20 may open the corresponding one or more flow valves 14a-14c for a specified amount of time corresponding to the selected beverage type and size. Alternatively or additionally, the dispense gesture input 38 may control at least one of the flow valves 14a-14c of the beverage sources 12a-12c to adjust a flow rate of the respective beverage components 13a-13c out of the nozzle 16, such as into a container 18 placed by the user below the nozzle 16. The gesture capture device 26 may be configured to receive any gesture as the dispense gesture input 38. In exemplary embodiments, the gesture capture device 26 may be configured to receive as a dispense gesture input 38 a rotate gesture or a pour gesture, which may be gestures that invoke a familiar and nature pouring motion in order to control the flow rate of the dispensed beverage. For example, this facilitates intuitive user operation of the beverage dispenser, particularly when "topping off" a container at the end of a dispense session. FIGS. 5A and 5B present exemplary embodiments of dispense gesture inputs 38 and associated GUIs 30.

Figure 6A:
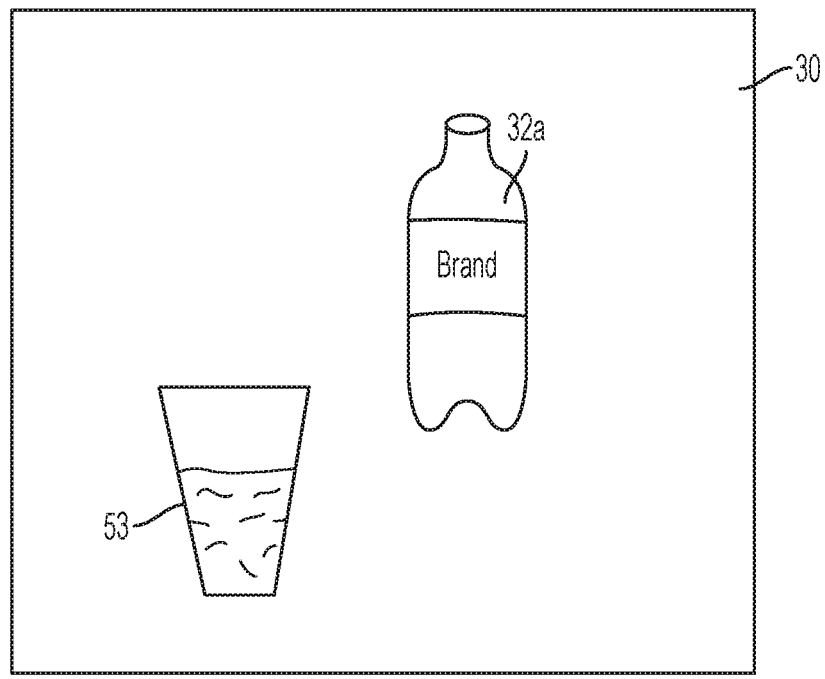
FIGS. 6A and 6B depict exemplary embodiments of presentations on a graphical display in conjunction with gesture inputs.
Figure 6A:
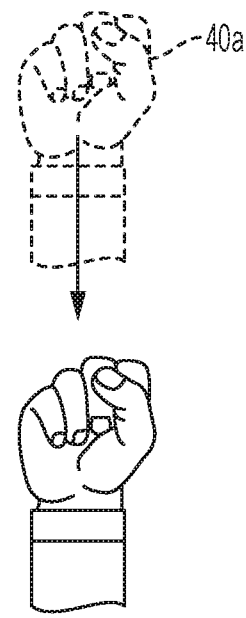
Figure 6B:
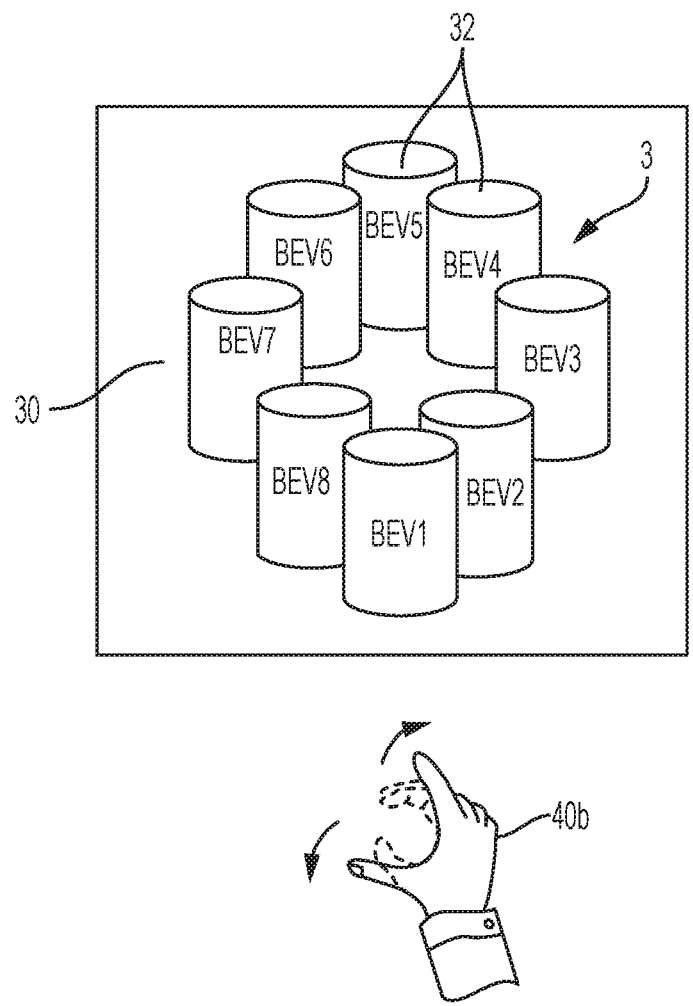

Finally, in the embodiment depicted in FIG. 2, when dispensing is underway, the controller 20 and gesture capture device 26 may then be in a mode prepared to receive an abort gesture input 40 to generate an abort dispense action 70 and stop the dispensing of the selected beverage. Upon receiving an abort gesture input 40, the controller 20 may instruct one or more of the flow valves 14a-14c to close. Such an embodiment may facilitate further user interaction during the beverage dispensing process by enabling the user to quickly abort a dispense after a less than full dispense of the beverage to provide the user with an opportunity to subsequently select one or more different beverages from the available beverages 3 for dispense in a beverage mixing approach. Alternatively or additionally, the abort action 70 may allow a user to stop the dispensing if there is a problem, such as the container 18 is not positioned correctly, the wrong beverage is dispensed, etc. The gesture capture device 26 may be configured to receive any gesture as the abort gesture input 40. To provide examples, the abort gesture input 40 may be a pull gesture or a drop gesture. FIGS. 6A and 6B present exemplary embodiments of abort gesture inputs 40 and associated GUIs 30.

Figure 3A:
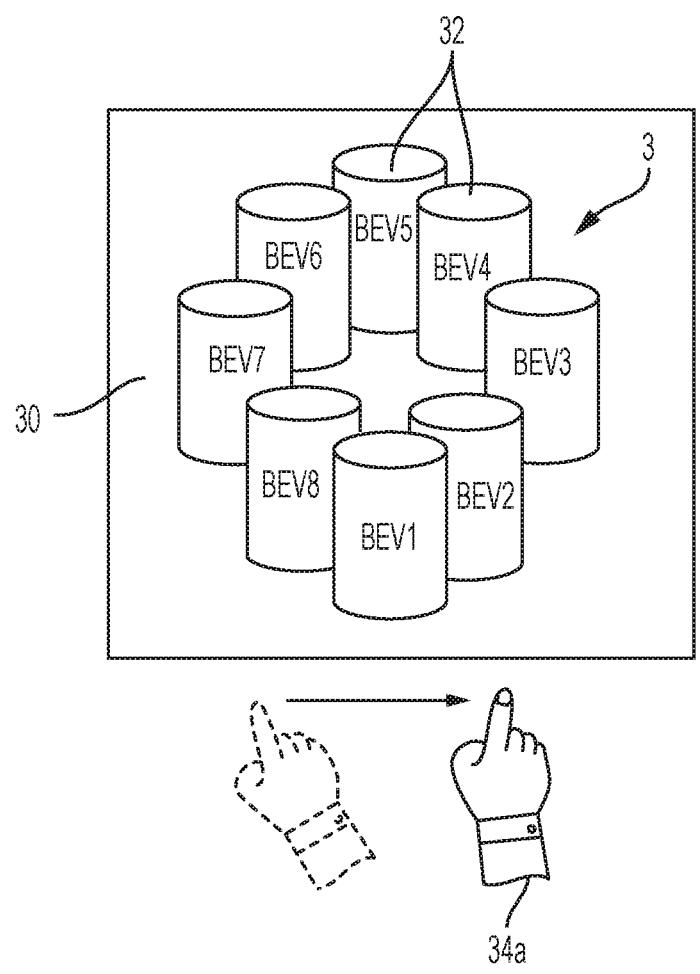

In FIG. 3A the GUI 30 presents an exemplary standby graphic, where each of the available beverages 3 is represented by a graphical object 32 on the graphical display 24. Accordingly, the GUI 30 in standby mode may present the available beverage option from which a user may select. In such a mode, the gesture capture device 26 may be configured to detect a browse gesture input. In the embodiment of FIG. 3A, the GUI 30 in standby mode 31 presents graphical objects 32 for each of the available beverages 3 arranged in a circle or ring that may be rotated upon receipt of a browse gesture input 34. In other embodiments the GUI 30 in standby mode 31 may present the graphical objects 32 for each of the available beverages 3 in a grid format, such as that depicted in FIG. 3B, in a list arrangement, or in any other arrangement. The graphical objects may include the beverage brand logo and/or depict a bottle, can, or other container representative of the available beverage 3. In other embodiments, the graphical object 32 for each available beverage 3 may simply represent the beverage in an alpha numeric text.

FIG. 3A depicts an exemplary browse gesture input illustrating a swipe gesture 34a, and an exemplary corresponding GUI 30 presenting graphical objects 32 that are rotated left and right by corresponding left and right swiping gestures 34a. The detection of the swipe gesture 34a may include motion pattern detection of an object moving laterally right-to-left or left-to-right in relative close proximity to the graphical display 24. This object may be, for example, a user's finger, hand, arm, head, etc., or it may be an inanimate object moved in the predefined pattern of the swipe gesture 34a. In the example of FIG. 3A, the swipe gesture is generated by user's hand, with an index finger extended, moving in the air from left to right. In various embodiments, the same swipe gesture 34a may also be made with different fingers or all fingers extended. A person having ordinary skill in the relevant art will understand in light of this disclosure, that the gesture capture device 26 may be configured to detect motion at various distance ranges and at various positions with respect to the graphical display 24, which may range from a few inches away from the graphical display 24 to several feet, or more, away from the graphical display 24.

FIG. 3B depicts another exemplary browse gesture input 34, which is a point gesture 34b. The gesture capture device 26 may be configured to detect a point gesture 34b, such as detecting the trajectory and/or angle and distance of an axis extending from a persons finger, in order to determine which graphical object 32 a user is pointing to on the graphical display 24. Furthermore, the system 10 may further be configured to adjust the GUI 30 in response to receipt of the pointing gesture 34b to place a graphical object 32 in a selection position 50. In the example of FIG. 3B, the GUI 30 highlights the graphical object 32 in the selection position 50 by enlarging the graphical object 32 in that position. In the Figure, beverage 9 is in the selection position 50, and thus the graphical object 32 representing beverage 9 is larger than the graphical objects 32 representing the other available beverages. Thus, as the user makes a pointing gesture 34b to various graphical objects 32 on the graphical display 24, the GUI 30 may enlarge the graphical object 32 pointed to. In other embodiments, the selection position 50 may be presented differently, such as at a fixed position on the graphical display 24 and/or within the GUI 30. FIG. 4A depicts one embodiment where the selection position 50 is the front position in the ring of graphical objects 32 representing the available beverages 3. Accordingly, referring again also to FIG. 3A, the GUI 30 may adjust in response to receipt of the swipe gesture 34a to circulate the graphical objects 32 of the available beverages 3 through the selection position 50 at the front of the ring, where the graphical object 32 may be presented larger and/or in better focus than those of the remaining available beverages.

Once a graphical object 32 is in a selection position 50, the beverage associated with that graphical object 32 in the selection position 50 may be selectable by a user upon receipt of a selection gesture input 36. In the example of FIG. 4A, the selection gesture input is a pinch gesture 36a where the gesture capture device 26 is configured to detect the motion of a user pinching their fingers together in order to select the beverage associated with the graphical object 32 in the selection position 50. In other embodiments, the selection gesture input 36 may equally be another gesture, such as a grasp gesture (e.g., bringing all fingers together as if grasping an object), a reach gesture (e.g., extending the arm out to bring the hand toward the graphical display 24), a thumbs-up had gesture, an OK head gesture, etc. FIG. 4B depicts another exemplary embodiment of a selection gesture input 36 that is a push gesture 36b, where the user pushes their hand forward toward the graphical display 24 while the graphical object 32 of the beverage they want to select is in the selection position 50. In any such embodiment, the gesture capture device 26 is configured to detect the predefined selection gesture input 36a, 36b and to enter the beverage associated with the graphical object 32 in the selection position 50 as the selected beverage.

In some embodiments, a user may be further required to select from other options, such as to choose a beverage size and or optionally select a beverage additive, such as ice, additional flavoring, etc. The selection of those items may be conducted similarly to the methods depicted in FIGS. 3A, 3B, 4A, and 4B. Once all of the necessary and desired beverage selections have been made, the beverage dispensing system 10 may be ready to dispense the selected beverage. At that point, the GUI 30 may depict a graphical object 32a representing the selected beverage. As depicted in FIGS. 5A and 5B, the GUI 30 may present a graphical depiction of the dispensing process, such as by manipulating the graphical object 32a to depict the dispensing of the selected beverage. In FIG. 5B, for example, the GUI 30 depicts the graphical object 32a representing the selected beverage as a bottle with the brand of the selected beverage pouring the selected beverage into a container graphic 53, which graphically depicts the state of the dispensing of the selected beverage into the container 18. In other embodiments, the container graphic 53 may represent the state of the dispensing process in another way, such as presenting a meter that shows the percentage completion of the dispensing process, such as the percentage of total volume of the selected beverage size that has been dispensed. Accordingly, the GUI 30 can inform the user via the container graphic 53 of how much of the selected beverage has been dispensed and/or when the dispensing is completed. For example, this may be helpful to a user who desires to fill only a portion of the container 18 with the selected beverage, such as in a beverage mixing approach.

In one embodiment, the user may control the dispensing process, such as the speed at which the selected beverage is dispensed and/or the amount of the selected beverage that is dispensed. FIGS. 5A and 5B depict exemplary dispense gesture inputs 38 that may be detected by the gesture capture device 26 in order to provide such control. FIG. 5A depicts that the dispense gesture input may be a rotate gesture 38A, which may correspond with the flow rate at which the user is instructing the selected beverage to be dispensed. Likewise, FIG. 5B depicts a pour gesture 38b, which is another exemplary dispense gesture input 38 that may be captured by the gesture capture device 26 in order to control the dispensing. Upon receipt of such a gesture, the gesture capture device 26 and/or the controller 20 may interpret the gesture to determine, for example, the angle of rotation of the user's hand and/or the speed at which the user is providing the rotate input 38a. The controller 20 may then control one or more of the flow valves 14a-14c in order to correspondingly control the flow of the selected beverage. Thus, for example, if a user provides a rotate gesture 38a quickly and in a clockwise direction, or receives a pour gesture 38b that is tilted downward to signify an extreme pour angle, the controller 20 may open one or more of the flow valves 14a-14c of the respective one or more beverage sources 12a-12c to dispense the selected beverage at the fastest possible flow rate. Likewise, if the rotate gesture 38a slows down and/or reverses in direction, or the pour gesture 38b moves back towards an upright position, then the controller 20 may restrict the one or more flow valves 14a-14c to reduce the flow rate of the beverage. Likewise, the controller 20 may stop the flow of the beverage upon receiving a corresponding dispense gesture input 38, such as if the rotate gesture 38a stops or if the pour gesture 38b is rotated to a complete upright position. Likewise, as described above, the GUI 30 may be operated to correspondingly depict the dispensing of the selected beverage, which may provide the user with feedback on their dispensing instruction and provide an interactive control of the flow rate and/or dispense amount of the selected beverage.

Alternatively or additionally, during the dispensing process the gesture capture device 26 may also be configured and available to receive an abort gesture input 40 to cause the beverage dispensing system 10 to stop dispensing the selected beverage. For example, the gesture capture device 26 may be configured to detect a pull gesture 40a, depicted in FIG. 6A, or a drop gesture 40b, depicted in FIG. 6B. Upon receipt of such a gesture by the gesture capture device 26 the controller 20 may immediately instruct closing the one or more flow valves 14a-14c to stop the dispensing. Upon receipt of such a gesture, the controller 20 may also adjust the GUI 30 to represent that the dispensing has stopped. For example, FIG. 6A depicts the exemplary GUI 30 of FIG. 5B after the abort gesture input 40 is received, which shows the graphical object 32a of the selected beverage in an upright position and not dispensing any of the selected beverage into the container graphic 53. The container graphic 53 shows the state of the dispensing, which demonstrates that the container 18 is about halfway full. At this point the system may variously be configured to stop the dispensing session all together, or to allow the user to resume the dispensing, such as by providing a dispense gesture input 38 and/or a browse gesture input 34. For example, FIG. 6B depicts an embodiment where the GUI 30 presents the graphical objects 32 associated with available beverages 3, such as the GUI 30 associated with the normal standby mode 31. In various embodiments, the beverage dispensing system 10 may further be configured to automatically stop dispensing when the container 18 has reached its maximum capacity, so as to avoid spillage.

FIG. 7 depicts one embodiment of a method 80 of dispensing a beverage from a beverage dispensing system 10. At step 60, graphical objects representing available beverages 3 are presented on graphical display 24. Once a browse input is received by the gesture capture device 26 at step 61, the graphical objects 32 on the graphical display 24 are adjusted, such as according to commands from the controller 20. If a browse input is not received at step 61, then the display 30 may remain in standby mode 31 awaiting user control input to the gesture capture device 26. Upon receiving a browse gesture input 34 at step 61 and adjusting the graphical objects 32 on the graphical display 24 accordingly, at step 61a the controller 20 and/or the gesture capture device 26 are prepared to receive a subsequent browse gesture input 34 and the return to step 62 to adjust the display accordingly. If no browse gesture input 34 is received, the system 10, including the controller 20 and/or the gesture capture device 26, may be prepared to receive a selection gesture input 36. If a selection gesture input 36 is not received at step 63, then the system 10, such as the controller 20, may jump to step 71 where it determines whether the system has timed out—i.e., whether a predetermined amount of time has passed indicating that the system should reset and start a new session. If the predetermined amount of time has not passed since receiving the last input from the user, then the system will return to steps 61a and 63 to determine whether input has been received. If the predetermined amount of time has passed, then the system may reset, such as returning to standby mode 31 and presenting the graphical objects 32 of the available beverages 3 on the graphical display 24. If a selection input is received at step 63, then the system may enter the selected beverage at step 64. At step 65, the system 10, such as the controller 20, may adjust the graphical display 24 to convey to the user that the selection has been entered. At step 66, the system 10, e.g., controller 20 and/or the gesture capture device 26, determines whether a dispense input gesture 38 has been received. The process represented at step 71 may continually run to determine whether or not a predetermined time has passed, after which the system may reset and return to step 60 and standby mode 31. Furthermore, in some embodiments of step 66, the controller 20 and/or the gesture capture device 26 may further be configured to receive any one of a browse gesture input 34, a selection gesture input 36, or a dispense gesture input 38, which would enable the user to make additional selections for the beverage dispensing, such as size selections, additive selections, etc., until they are satisfied with the order and want to instruct the dispensing. To provide an example of one such embodiment, the graphical display may be updated at step 65 to instruct a user to provide a browse gesture input 34 or a selection gesture input 36 if they wish to continue the beverage selection process and provide a dispense gesture input 38 to complete the selection process and begin dispensing the selected beverage.

Once a dispense gesture input 38 is received at step 66, the controller 20 may adjust the flow valve 14 accordingly, as is described above. At step 68, the system, such as the controller 20 and/or gesture capture device 26, assesses whether an abort gesture input 40 is received. If so, then the controller 20 may execute step 70 to close the flow valve 14. If no abort gesture input 40 is received, the controller determines at step 69 whether or not the container 18 is full. This may include determining how many ounces of beverage have been dispensed and/or sensing whether the container 18 is full. If the container is not full, the controller 20 returns to step 66 where it determines whether further dispense gesture input 38 has been received. If at step 69, the controller 20 determines that the container is full, then it continues to step 70 where it instructs the flow valve 14 to close. Once the valve has been closed and the selected beverage is no longer being dispensed, the system may return to standby mode 31 at step 60.

In order to perform the functions and method steps described herein, the controller 20 loads and executes software from the memory 22, which may include one or more applications comprising computer-readable instructions that, when executed by the controller 20 and/or gesture capture device 26 direct or initiate the operations described herein. It should be understood that such computer-readable instructions may be contained in a single software element having one or more modules, or may be distributed over several software elements, or applications. Similarly, while the description provided herein refers to a single controller 20, it is recognized that implementations of the beverage dispensing system 10 can be performed using one or more controllers, which may be communicatively connected, and that such implementations are considered to be within the scope of this description. The controller 20 may be one or more microprocessors and other circuitry or subsystems that receive and execute software from memory 22. Examples of controller 20 include a general purpose central processing unit(s), application-specific processor(s) and/or logic device(s), as well as any other type of processing device(s), combinations of processing devices, or variations thereof.

The memory 22 may comprise any storage media, or group of storage media, readable by the controller 20, and capable of storing software. The memory 22 can include volatile and non-volatile memory, removable and non-removable media implemented in any method or technology for storage information, such as computer-readable instructions, data structures, program modules, or other data. The memory 22 may be implemented as a single storage device, but may also be implemented across multiple storage devices or sub-systems, which may be accessible to the controller 20. The memory 22 may further include additional elements, such as a controller capable of communicating with the controller 20. Examples of storage media include random access memory, read only memory, magnetic disks, optical disks, flash memory, virtual memory, non-virtual memory, magnetic sets, magnetic tape, magnetic disk storage or other magnetic storage devices, or any other medium which can be used to store the desired digital information and that may be accessed by a controller 20, as well as any combination or variation thereof, or any other type of storage medium. In some implementations, the storage media may be non-transitory storage media. In some implementations, at least a portion of the storage media may be transitory.

The beverage dispensing system 10 and method 80, in the various embodiments described herein, yield advantages over previous beverage dispensing systems and methods because it avoids problems arising from the susceptibility of touch-sensitive user interfaces to scratching, damage, and EMI noise, which decreasing reliability and increasing required maintenance. The gesture-based input systems described herein result in embodiments that are more adaptive to user needs and operable by a wide variety of users, including users with prosthetics, hearing-impaired users, users speaking a variety of languages, etc. Furthermore, with the elimination of any common surfaces touched by users, embodiments can provide a more sanitary user experience with contamination-free operation.

In the present Description, certain terms have been used for brevity, clearness and understanding. No unnecessary limitations are to be implied therefrom beyond the requirement of the prior art because such terms are used for descriptive purposes only and are intended to be broadly construed. The different embodiments described herein may be used alone or in combination with other apparatuses, systems and methods. Various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. A beverage dispensing system comprising:
 a plurality of beverage sources, each containing a beverage component;
 at least one flow valve connected to one or more of the beverage sources and operable to control a flow of the beverage component therefrom;
 a graphical display that presents a plurality of available beverages;
 a gesture capture device that optically detects a selection gesture input to select a beverage from the plurality of available beverages wherein the selection gesture input includes at least one of a push gesture, a grasp gesture, a reach gesture, and a pinch gesture;

a dispense gesture input to control dispensing the selected beverage, wherein the dispense gesture is one of a rotate gesture and a pour gesture in which a user's hand rotates from a vertical orientation to a horizontal orientation;

a controller that adjusts the at least one flow valve based on the selection gesture input and/or the dispense gesture input to dispense the selected beverage.

2. The beverage dispensing system of claim 1 wherein each of the plurality of available beverages is represented by a graphical object presented on the graphical display.

3. The beverage dispensing system of claim 2 wherein the gesture capture device further optically detects a browse gesture input to adjust the presentation of graphical objects on the graphical display.

4. The beverage dispensing system of claim 3 wherein, in response to receipt of the browse gesture input, the controller places the graphical object of one of the plurality of available beverages in a selection position on the graphical display.

5. The beverage dispensing system of claim 3 wherein the browse gesture input includes at least one of a swipe gesture and a point gesture.

6. The beverage dispensing system of claim 1 wherein the controller adjusts the flow valve based on the dispense gesture input to adjust a flow rate of the beverage component from the one or more of the beverage sources.

7. The beverage dispensing system of claim 1 wherein the gesture capture device further optically detects an abort gesture input, and wherein the controller closes the flow valve in response to receipt of the abort gesture input.

8. The beverage dispensing system of claim 7 wherein the abort gesture input is one of a drop gesture or a pull gesture.

9. A method of dispensing a beverage from a beverage dispensing system, the method comprising:

presenting at least one graphical object on a graphical display, each graphical object representing an available beverage;

optically detecting a browse gesture input at a gesture capture device, wherein the browse gesture input includes at least one of a swipe gesture and a point gesture;

adjusting the graphical object on the graphical display based on the browse gesture input;

optically detecting a selection gesture input selecting one of the available beverages, wherein the selection gesture input includes at least one of a push gesture, a grasp gesture, a reach gesture, and a pinch gesture; and controlling the beverage dispensing system with a controller to dispense the selected one of the available beverages based on the selection gesture input.

10. The method of claim 9 wherein the step of adjusting the graphical object on the graphical display based on the browse gesture input includes placing the graphical object in a selection position on the graphical display.

11. The method of claim 9 wherein the controller is communicatively connected to the gesture capture device, the graphical display, and at least one flow valve connected to a beverage source, wherein the step of controlling the beverage dispensing system includes adjusting the at least one flow valve to control a flow of a beverage component from the beverage source.

12. The method of claim 11 further including optically detecting a dispense gesture input, and controlling the at least one flow valve based on the dispense gesture input to dispense a beverage component from the beverage source.

13. The method of claim 12 wherein the step of controlling the at least one flow valve includes adjusting a flow rate of the beverage component from the beverage source in response to the dispense gesture input.

14. The method of claim 13, wherein the dispense gesture input is one of a rotate gesture or a pour gesture.

15. The method of claim 13 further including adjusting the graphical object representing the selected one of the available beverages to graphically depict the dispensing in accordance with the received dispense gesture input.

16. The method of claim 13 further including presenting a container graphic on the graphical display that represents a state of the dispensing of the selected beverage.

17. The method of claim 11 further including optically detecting an abort gesture input, and wherein the step of controlling the beverage dispensing system includes closing the at least one flow valve to stop the flow the beverage component from the beverage source.

* * * * *